United States Patent [19]

Kulakowski et al.

[11] Patent Number: 4,839,877
[45] Date of Patent: Jun. 13, 1989

[54] ROTATIONAL POSITION CONTROLS FOR OPTICAL DISK PLAYERS USING REMOVABLE DISKS

[75] Inventors: John E. Kulakowski; Rodney J. Means, both of Tucson, Ariz.

[73] Assignee: International Business Machines Corporation, Armonk, N.Y.

[21] Appl. No.: 104,143

[22] Filed: Oct. 2, 1987

[51] Int. Cl.⁴ .................. G11B 15/52; G11B 27/22
[52] U.S. Cl. ............................................. 369/48
[58] Field of Search .............. 369/48, 52, 55, 56, 369/57, 58

[56] References Cited

U.S. PATENT DOCUMENTS

| | | | |
|---|---|---|---|
| 3,958,271 | 5/1976 | Sumiyoshi | 360/70 |
| 4,037,260 | 7/1977 | Busby, Jr. et al. | 360/73 |
| 4,062,048 | 12/1977 | Weber | 360/72 |
| 4,190,860 | 2/1980 | Somers et al. | 360/73 |
| 4,371,902 | 2/1983 | Baxter et al. | 360/75 |
| 4,471,391 | 9/1984 | Reagan | 360/72.3 |
| 4,527,263 | 7/1985 | Nakagawa | 369/58 |
| 4,611,317 | 9/1986 | Takeuchi et al. | 369/58 |
| 4,644,514 | 2/1987 | Ohshima et al. | 369/52 |
| 4,656,532 | 4/1987 | Greenberg et al. | 360/48 |
| 4,660,189 | 4/1987 | Tsukamura et al. | 369/58 |
| 4,688,203 | 8/1987 | Koishi et al. | 369/52 |

FOREIGN PATENT DOCUMENTS 152245  8/1985  European Pat. Off. .

OTHER PUBLICATIONS

"Introduction to IBM Direct Access Storage Devices", M. Bohl, pp. 27-35; 72-85; 1981.

Primary Examiner—William L. Sikes
Assistant Examiner—Robert E. Wise
Attorney, Agent, or Firm—H. F. Somermeyer

[57] ABSTRACT

A record disk player removably receives for rotation a record disk having an index mark as the sole circumferential position indicator. A spindle in the player has a tachometer with marks angularly displaced a distance equal to the disk storing a predetermined number of bytes on the respective record tracks. A byte counter counts byte periods and is reset by each of the tachometer marks for indicating offset of the marks from the index signal. A register stores the offset as determined by the count in the segment counter at index time. A segment counter counts tachometer pulses for indicating which of the segments are currently being scanned on the record disk. The segment count when coupled with an offset indication provides true rotational position to a byte granularity. The index pulse resets the tachometer counter to zero. The tachometer counter has a modulus equal to the number of groups of bytes (segments) in each of the record tracks.

12 Claims, 2 Drawing Sheets

4,839,877

ROTATIONAL POSITION CONTROLS FOR OPTICAL DISK PLAYERS USING REMOVABLE DISKS

DOCUMENT INCORPORATED BY REFERENCE

Science Research Assoc., Inc., Chicago, Ill., "INTRODUCTION TO IBM DIRECT ACCESS STORAGE DEVICES" by Marilyn Bohl, pages 27-35 and pages 72-85, copyright 1981.

BACKGROUND OF THE INVENTION

1. Field of the Invention

The invention relates to optical disk players having removable disks and particularly for controlling electronic circuit operation with respect to the rotational position of the disk.

2. Discussion of the Prior Art

Both magnetic and optical disk recorders are also referred to as direct access storage devices (DASD). These devices characteristically have either one or two data recording formats which determine the addressability of data stored on the respective disks. One type is a so-called fixed-block architecture (FBA) and the other is count-key data (CKD). FBA track formatting is described by Bohl, supra, beginning at page 82. The present invention is more applicable to the CKD format architecture.

CKD architecture is explained by Bohl, supra, beginning on page 72. CKD architecture is characterized by a single index mark, either embossed or permanently recorded, in each track of all of the tracks on the disk. No sector marks or other rotational position-indicating indicia are needed on the record disk. On those DASDs, such as the IBM 3380 Magnetic DASD, have record disks mounted on a single spindle for co-rotation along with a so-called servo disk. The servo disk has a precise fixed relationship to all of the record disks on the spindle and contains radial (tracking) positional information as well as rotational position information. However, when a single optical disk is removably mounted on a DASD, then the luxury of a servo surface is either very expensive, i.e. takes up one-half of the storage capacity of the disk, or is not available. It is desired to avoid a servo disk in this situation. The present invention is directed to such a system, employing a removable disk without rotational position-indicating indicia other than an index point. This arrangement maximizes the data storage capacity usage of the record disk.

When record disks store data at a high density, then rotational position must be precisely defined. Resynchronizing and recalibrating rotational position once per rotation of the disk at an index point is unsatisfactory as most oscillators will drift in phase and hence give erroneous rotational position indications. Another factor requiring precise rotational position indication is defect avoidance. In the IBM 3344 and 3350 disk storage units, provision is made for skipping over a surface defect on a track while still using the rest of the track for data. See page 30 of Bohl, supra.

In the home address area (HA) of each CKD formatted high-density track, a skip displacement from index is stored. In the 3344 or 3350 the servo surface provides for counting rotational position in fixed synchronism with all of the record disks on the common spindle. Since CKD architecture does not provide for rotational position indication on the disk surface and precision in rotational position detection is required, a suitable rotational position control is required. Note that on fixed-block architecture, as described on page 30 of Bohl, supra, a sector that has a defect in it is termed a defective sector, and a spare sector on the same track is used to replace the storage capacity of the defective sector.

SUMMARY OF THE INVENTION

In a disk recorder adapted to removably receive and support a record disk for rotation which has a single index point per record track on the disk, precision rotational position location is enabled using a simple circuit arrangement. The spindle supporting the removable disk includes a tachometer having a plurality of precise rotational reference marks circumferentially spaced apart a number which is a power-of-two byte-storage locations on the record disk. Means are provided for detecting the index pulse of each of the tracks. First circuit means are operatively coupled to the tachometer and to the index detector for measuring the relative rotational position of the optical disk index mark with respect to the tachometer rotational reference marks and supplies a delta or offset signal indicative of the relative rotational position of the tachometer and the record disk in a modulus to said power of two. The second circuit means are operatively coupled to the first circuit means for receiving the delta signal and the rotational reference marks for precisely indicating disk rotational position of segments of byte storage areas arranged in groups to said power-of-two. Third circuit means are operatively coupled to the first and second circuit means for receiving the rotational position signals and then synchronizing operation of the disk player to the delta signal whereby the groups of byte signals, up to said power-of-two, are precisely located. Defect skipping of such groups having a number of bytes equal to said power-of-two are identified in a so-called home address area of each of the respective tracks for enabling skipping the defective groups.

The foregoing and other objects, features, and advantages of the invention will be apparent from the following more particular description of preferred embodiment of the invention, as illustrated in the accompanying drawings.

DESCRIPTION OF THE ILLUSTRATIVE EMBODIMENT

DETAILED DESCRIPTION

Figure 1:
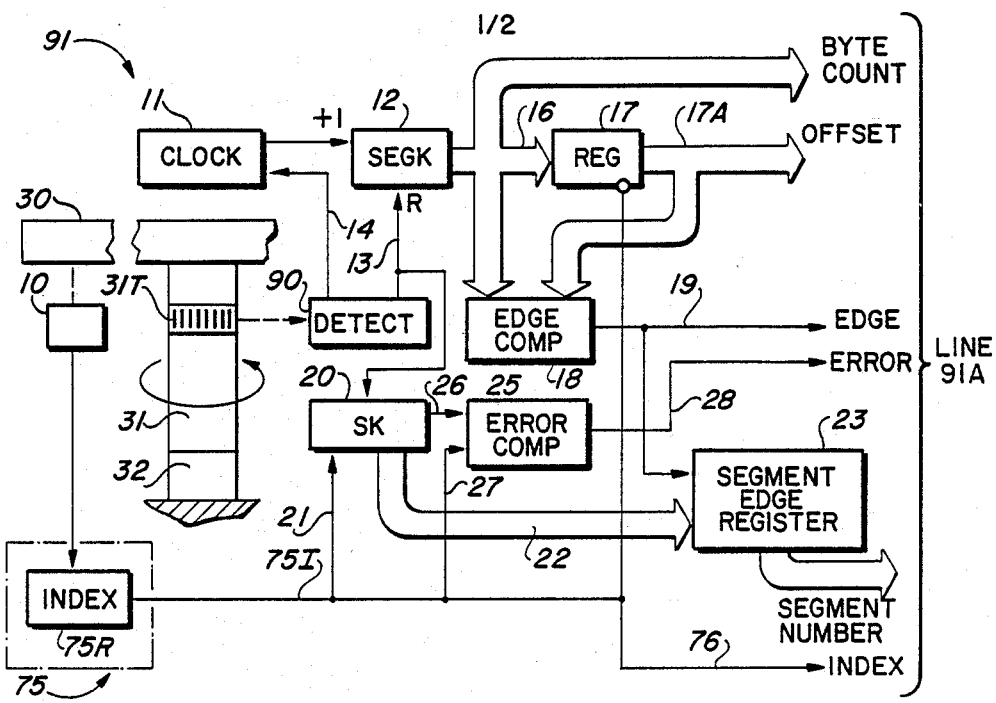
FIG. 1 is a simplified diagrammatic showing of a preferred embodiment of the present invention as would be used with an optical disk.

Referring now more particularly to the drawing, like numbers indicate like parts in structural figures and features in the three figures. Optical record disk 30 is optically scanned by the transducer player system 10 for producing readback signals supplied over line 10A, as detailed in FIG. 2. Index-detecting circuit 75R, which is a portion of later-described data circuits 75, responds to the signals on line 10A to produce a disk index signal on line 75I. An index signal I on disk 30 can be magnetically recorded, embossed, etched, laser cut, knurled, or molded as a surface perturbation, etc., as a line extending radially of the disk. This precise line is the circumferential reference point for all record tracks (not shown) on disk 30. The index line can be factory written or written when the disk 30 has at least one track surface analyzed. Disk 30 tracks may be constructed in grooves and mesas which are circumferentially extending around the disk, as is a usual practice for optical disks. Such grooves and mesas are detected by the playback circuits for indicating radial position of a beam of light, as later explained with respect to FIG. 2.

Disk 30 is suitably removably mounted for rotation on spindle 31 which is rotated by spindle motor 32. Disk 30 is not rotationally oriented on spindle 31. A tachometer 31T is embossed o the shaft 31 for precisely indicating rotational position of the spindle, and includes a large plurality of rotational position-indicating marks, plus an index or reference mark. It is well known how to provide tachometer reference points on a spindle to a high precision.

First circuit means are operatively connected to tachometer 31T and to the readback apparatus 10 for comparing the phase difference between the index of disk 30 with respect to the tachometer marks 31T. For purposes of simplicity in design, the position indicating marks of tachometer 31T subtend an angle which is a power-of-two greater than the angle subtended by recording a byte of data (8 bits with parity) on a track of record disk 30. For example, the center-to-center spacing, or edge-to-edge spacing, of two adjacent tachometer marks subtend an angle of disk 30 by 32 bytes recorded in a track on disk 30. The elapsed time necessary for apparatus to scan one byte of data recorded on disk 30 is termed a byte period. The time for the spindle 31 to rotate between two adjacent tachometer marks is termed a segment period which is equal to 32 byte periods. A segment period then allows apparatus 10 to scan 32 bytes of data on disk 30. Logically, the rotational positions of the bytes recorded circumferentially in a track on disk 30, are divided into segments of 32 bytes each. There are no 32 byte boundaries embossed or otherwise physically placed on disk 30. The precise rotational position of each segment is indicated by a first circuit means operation by comparing the tachometer 31T mark timings with the index pulse supplied by apparatus 10 from disk 30.

The first circuit means includes detect circuit 90 optically coupled to tachometer 31T for sensing the tachometer marks as they pass a sensing position (of known design). Detect circuit 90 supplies a tachometer mark-pulse signal over line 13 to precisely indicate rotational location of the respective marks. An oscillator or clock 11 of the first circuit means is precisely tuned to oscillate, having a byte period for each cycle of oscillation. Of course, it is realized that a base oscillator may operate at an extremely high frequency and be frequency divided to provide a clock periodicity of one byte period. The operation of clock 11 may be frequency synchronized (not required) to detect circuit 90 and hence the tachometer marks by signals flowing over line 14 to clock 11. Such clock synchronization is well understood and is not described for that reason. Thirty-two byte periods occur between each two successive tachometer pulses. The phase or circumferential offset between the index line I on disk 30 and the tachometer 31T reference point is determined by a segment counter SEGK 12 of the first circuit means. Clock 11 increments SEGK 12 once for each byte period. SEGK 12 is designed to repeatedly count from zero through 31, i.e., represents 32 bytes in a segment. The tachometer mark-indicating pulse on line 13 resets SEGK 12 to zero thereby synchronizing the counting to tachometer 31T. While SEGK 12 is synchronized to tachometer 31T, index-detecting circuit 75R responds to detecting the index pulse I by a signal 75I to register 17 of the first circuit means. Register 17 has the same modulus as SEGK 12. The index pulse on line 75I enables register 17 to capture a current count in SEGK 12 as supplied over a plurality of lines collectively indicated by numeral 16. The count in register 17 then indicates the number of byte periods of segment-phase displacement between the index line I on disk 30 and each and every one of the tachometer marks in tachometer 31T. Subtracting the segment offset value stored in register 17 from the byte count value in SEGK 12 identifies the precise rotational first byte position within each segment.

Figure 3:
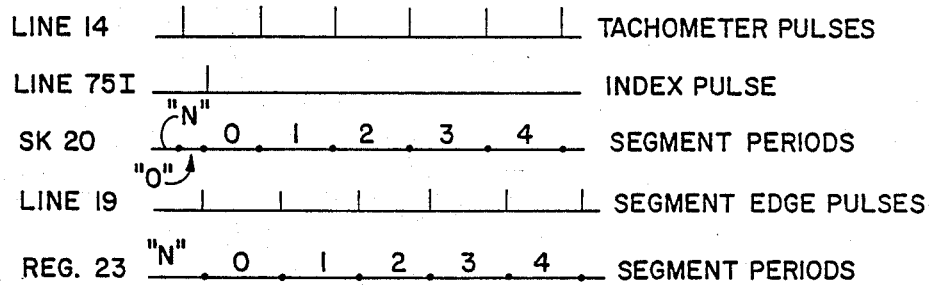
FIG. 3 is a simplified timing chart showing operation of the FIG. 1 illustrated circuits.

Second circuit means are coupled to the above-described first circuit means for indicating the boundaries of the segments of bytes along a track being scanned and the segment number (rotational position) along the track. For example, there can be 2,322 segments in a track. The precise rotational position of each segment is indicated jointly by the segment-edge signal on line 19 from edge comparator (edge comp) 18, which looks for equality between the SEGK 12 and the register 17 contents. The circumferential displacement along the track being scanned is indicated by the numerical contents of segment counter SK 20, which is a tachometer pulse counter. Detect circuit 90 supplies the line 13 pulses for incrementing SK 20 by unity. Each SK 20 counts up to a modulus of a number of segments in a record track of disk 30. The index-indicating signal on line 75I travels over line 21 for resetting SK 20 to zero. Whenever transducer 45 is moving radially of disk 30, as during a track seek, SK 20 continues to count to the maximum segment number, then begins a new count cycle at zero. This action synchronizes the count in SK 20 to the disk 30 index I and maintains rotational synchronization when index I is not sensed. SK 20 continuously supplies the segment number over a set of lines collectively designated by numeral 22 to segment edge register 23. Segment edge comparator 18 activates register 23 to receive and store the current segment number, the timing of such capture is shown in FIG. 3. Microprocessor 40 (other electronic circuits may also perform this function) using the techniques commonly applied in magnetic DASD, as set forth in Bohl, supra, rotationally addresses the segment using known rotational position-addressing techniques. Subsequent to initiating the synchronization of SK 20 to the index pulse, it is desired to ensure that SK 20 is faithfully counting the segments. To this end, error comparator (error comp) circuit 25 receives the current SK 20 count over a set of electrical lines 26. The line 75I signal also goes to input 27 of comparator circuit 25. When index pulse reaches comparator circuit 25, SK 20 must have a numerical content of zero, otherwise a phase error exists in the segment identification with respect to index I. In the rare event such an error is detected, an error signal is supplied over line 28 to microprocessor 40 for indicating a fault condition. FIG. 3 shows the timing of operation of the FIG. 1-illustrated circuit. The line 14 tachometer pulses are time displaced (circumferentially offset) from the index pulse on line 75I and hence the segment periods and segment edge pulses. This offset is random for each insertion of a removable disk 30 into disk player 10 but constant during each disk insertion. The line 75I pulse resets SK 20 to start the segment counting at all 0s. The line 19 segment edge pulses synchronize the circuit operation to the segments on disk 30. When the segment N of a given track is being scanned (see N for SK 20 and register 23), the line 13 tachometer pulse advances SK 20 from N to N+1 before the index pulse on line 75I occurs. Register 23, however, does not advance to segment 0 until the index pulse resets or clears SK20 and line 19 is active thereby ensuring synchronization of circuit operation to disk 30 and the use of the tachometer pulses for indicating circumferential locations of the disk 30 segments. The disk 30 rotates in the direction of the arrow A (FIG. 1A) with a single record track indicated by a dashed line T. The radially-extending index line I is the index detected by circuit 75R. The various segment locations S, which are logical and not sensible by any indicia existing on the disk 30, are symbolically indicated in FIG. 1A by the dashed radial lines. For defect accommodation, once a segment is identified as being defective, using known techniques, its circumferential address, i.e., segment number, is stored in the home address HA area of the track T in which the segment resides. Remember, no segment is identified on the surface of disk 30 by any physical markers. Depending upon the defect frequency of a disk and the upper size limit of HA, any number of defective segments may be identified in HA. Following such identification, the addressing and defect skipping used on the IBM 3330 and other DASDs may be employed. Such techniques are well known and not described for that reason.

Figure 2:
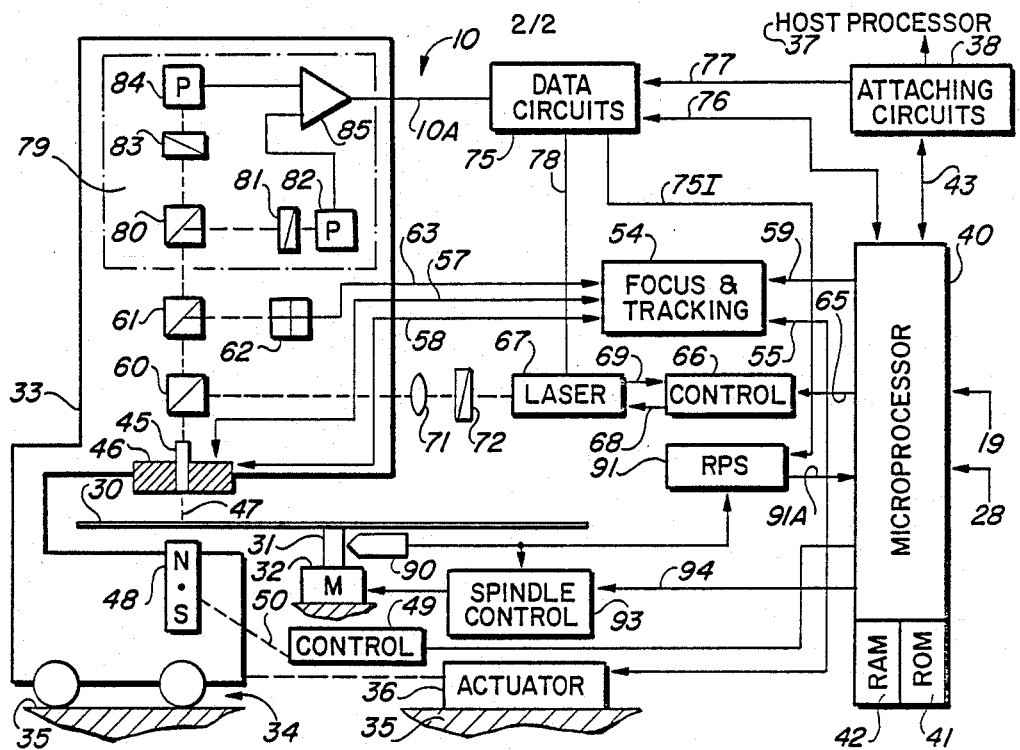
FIG. 2 is a block diagram of an optical disk recorder player in which the preferred illustrated embodiment of FIG. 1 is advantageously employed.

An optical recorder with which the present invention may be advantageously employed is shown in FIG. 2. A magnetooptic record disk 30 is mounted for rotation on spindle 31 by motor 32. Optical head-carrying arm 33 on head-arm carriage, generally denoted by numeral 34, moves radially of disk 30. A frame 35 suitably mounts carriage 34 for reciprocating radial motions. The radial motions of carriage 34 enable access to any one of a plurality of concentric tracks or circumvolutions of a spiral track for recording and recovering data on and from disk 30. Linear actuator 36 suitably mounted on frame 35, radially moves carriage 34 for enabling the track accessing. The recorder is suitably attached to one or more host processors 37, such host processors may be control units, personal computers, large system computers, communication systems, image process processors, and the like. Attaching circuits 38 provide the logical and electrical connections between the optical recorder and the attaching host processors 37.

Microprocessor 40 controls the recorder, including the attachment to the host processor 37. Control data, status data, commands and the like are exchanged between attaching circuits 38 and microprocessor 40 via bidirectional bus 43.

Included in microprocessor 40 is a program or microcode storing read only memory (ROM) 41 and a data and control signal storing random access memory (RAM) 42.

The optics of the recorder include an objective or focussing lens 45 mounted for focussing and tracking motions on head arm 33 by fine actuator 46. This actuator includes mechanisms for moving lens 45 toward and away from disk 30 for focussing and track following and seeking movements radially of disk 30; for example, for changing tracks within a range of 100 tracks so that carriage 34 need not be actuated each time a track adjacent to a track currently being accessed is to be accessed. Numeral 47 denotes the two-way light path between lens 45 and disk 30.

In magnetooptic recording, magnet 48 provides a weak magnetic steering field for directing the remanent magnetization direction of a small spot on disk 30 illuminated by laser light from lens 46. The laser-light spot heats the illuminated spot on the record disk to a temperature above the Curie point of the magnetooptic layer (not shown, but can be an alloy of rare earth and transitional metals as taught by Chaudhari, et al., U.S. Pat. No. 3,949,387). This heating enables magnet 48 to direct the remanent magnetization to a desired direction of magnetization as the spot cools below the Curie point temperature. Magnet 48 is shown as oriented in the "write" direction, i.e. binary ones are recorded on disk 30 normally are "north pole remanent magnetization". To erase disk 30, magnet 48 rotates so the south pole is adjacent disk 30. Magnet 48 control 49 which is mechanically coupled to rotatable magnet 48 as indicated by dashed line 50, controls the write and erase directions. An electric coil may be substituted for the magnet 48. Then, the directions of electrical current flow in the coil determines write or erase directions of remanent magnetzation. Microprocessor 40 supplies control signals over line 51 to control 49 for effecting reversal of the recording direction.

It is necessary to control the radial position of the beam following path 47 such that a track or circumvolution is faithfully followed and that a desired track or circumvolution is quickly and precisely accessed. To this end, focus and tracking circuits 54 control both the coarse actuator 36 and fine actuator 46. The positioning of carriage 34 by actuator 36 is precisely controlled by control signals supplied by circuits 54 over line 55. Additionally, the actuator control by circuits 54 is exercised by control signals travelling over lines 57 and 58, respectively, for focus and fine tracking and switching actions of fine actuator 46.

The focus and tracking position sensing is achieved by analyzing laser light reflected from disk 30 over path 47, thence through lens 45, through one-half mirror 60 to be reflected by half-mirror 61 to a so-called "quad detector" 62. Suitable optical means are included for distorting the light beam for enabling generation of focus and track position error signals. Quad detector 62 has four photo elements which respectively supply signals o four lines collectively denominated by numeral 63 to focus and tracking circuits 54. Aligning one axis of the detector 62 with a track center line, track following operations are enabled. Focussing operations are achieved by comparing the light intensities detected by the four photo elements in the quad detector 62. Focus and tracking circuits 54 analyze the signals on lines 63 to control both focus and tracking.

Recording or writing data onto disk 30 is next described. It is assumed that magnet 48 is rotated to the desired position for recording data. Microprocessor 40 supplies a control signal over line 65 to laser control 66 for indicating that a recording operation is to ensue. This means that laser 67 is energized by control 66 to emit a high-intensity laser light beam for recording; in contrast, for reading, the laser 67 emitted laser light beam has a reduced intensity does not heat the laser-illuminated spot on disk 30 above the Curie point. Control 66 supplies its control signal over line 68 to laser 67 and receives a feedback signal over line 69 indicating the laser 67 emitted light intensity. Control 68 adjusts the light intensity to the desired value. Laser 67, a semiconductor laser such as a gallium-arsenide diode laser, can be modulated by data signals so the emitted light beam represents the data to be recorded by such intensity modulation. In this regard, data circuits 75 (later described) supply data-indicating signals over line 78 to laser 67 for effecting such modulation. This modulated light beam passes through polarizer 72 (linearly polarizing the beam), thence through collimating lens 71 toward half mirror 60 for being reflected toward disk 30 through lens 45. Data circuits 75 are prepared for recording the microprocessor 40 supplied suitable control signals over line 76. Microprocessor 40 in preparing circuits 75, is responding to commands for recording received from a host processor 37 via attaching circuits 38. Once data circuits 75 are prepared, data is transferred directly between host processor 37 data circuits 75 through attaching circuits 38. Data circuits 75 also ancillary circuits (not shown) relating to disk 30 format signals, error detection and correction and the like. Circuits 75, during a read or recovery action, strip the ancillary signals from the readback signals before supply-corrected data signals over bus 77 to host processor 37 via attaching circuits 38. The index pulse or signal on line 75I is supplied to RPS circuits 91.

Figure 1A:
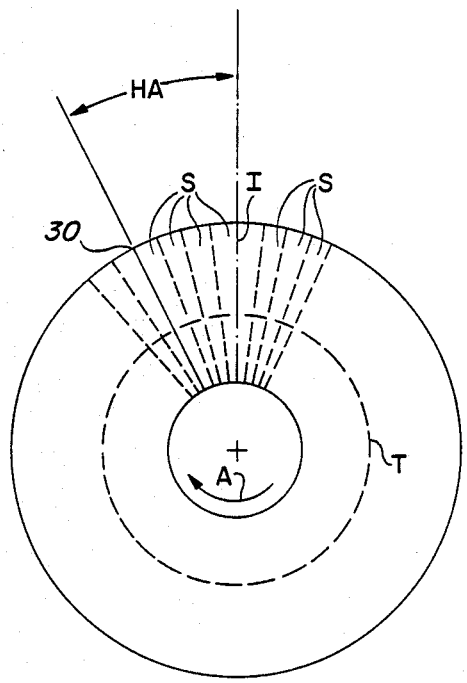
FIG. 1(a) is a simplified plan format illustration of a removable record disk usable with a FIG. 1 illustrated circuitry.

Reading or recovering data from disk 30 for transmission to a host processor requires optical and electrical processing of the laser light beam from the disk 30. That portion of the reflected light (which has its linear polarization from polarizer 72 rotated by disk 30 recording using the Kerr effect) travels along the two-way light path 47, through lens 45 and half-mirrors 60 and 61 to the data-detection portion 79 of the head arm 33 optics. Half-mirror or beam splitter 80 divides the reflected beam into two equal intensity beams both having the same reflected rotated linear polarization. The half-mirror 80 reflected light travels through a first polarizer 81 which is set to pass only that reflected light which was rotated when the remanent magnetization on disk 30 spot being accessed has a "north" or binary one indication. This passed light impinges on photo cell 82 for supplying a suitable indicating signal to differential amplifier 85. When the reflected light was rotated by a "south" or erased pole direction remanent magnetization, then polarizer 81 passes no or very little light, resulting in no active signal being supplied by photo cell 82. The opposite operation occurs by polarizer 83 which passes only "south" rotated laser light beam to photo cell 84. Photo cell 84 supplies its signal indicating its received laser light to the second input of differential amplifier 85. The amplifier 85 supplies the resulting difference signal (data representing) to data circuits 75 for detection. The detected signals include not only data that is recorded, but also all of the so-called ancillary signals as well. The term data as used herein, is intended to include any and all information-bearing signals, preferably of the digital or discrete value type. The rotational position and speed of spindle 31 is sensed by a suitable tachometer or emitter detector 90. Detector 90, preferably of the optical-sensing type that senses dark and light spots on a tachometer wheel (not shown) of spindle 31, supplies the "tach" signals (digital signals) to RPS circuit 91 which detects the rotational position of spindle 31 and supplies rotational information-bearing signals to microprocessor 40. The circuits of FIG. 1 are a portion of RPS circuits 91. Microprocessor 40 employs such rotational signals for controlling access to data storing segments on disk 30 as is widely practiced in the magnetic data storing disks. Additionally, the clock 11 signals and detector 90 line 14 signals also travel to spindle speed control circuits 93 for controlling motor 32 to rotate spindle 31 at a constant rotational speed. Control 93 may include a crystal-controlled oscillator for controlling motor 32 speed, as is well known. Microprocessor 40 supplies control signals over line 94 to control 93 in the usual manner.

While the invention has been particularly shown and described with reference to its preferred embodiment thereof, it will be understood by those skilled in the art that various changes in form and details may be made therein without departing from the spirit and scope of the invention.

What is claimed is:

1. In an optical disk player, a spindle for rotatably, removably receiving and supporting an optical disk having radially-extending index line on the data disk which extends radially across a data recording area;
    a tachometer member on the spindle having a plurality of precise rotational reference marks;
    a rotational-position index mark on the optical disk;
    first circuit means operatively coupled to said tachometer and to an optical disk supported on the spindle for measuring the relative rotational position of the optical disk index mark to any one of the tachometer rotational reference marks, and for supplying a delta signal representative of such relative rotational position for each of said tachometer rotational reference marks;
    second circuit means operatively coupled to said first circuit means for receiving said delta signal and for generating rotational position signals indicating the precise rotational position of the optical disk related to the tachometer member and recalibrating said precise rotational position at each of said tachometer rotational reference marks; and
    third circuit means operatively coupled to said first and second circuit means for receiving said rotational position signals for synchronizing operation of the disk player to the delta signal.

2. In the disk, player set forth in claim 1, further including, in combination:
    said third circuit means, including:
    microprocessor means receiving said rotational position signals and having means for converting same to circumferential addresses.

3. In the disk player set forth in claim 1, further including, in combination:
    said first circuit means, including:
    a photodetector circuit in optical communication with said tachometer member for detecting said marks and generating a tachometer mark pulse for each of the marks scanned;
    a clock for outputting clock signals corresponding to a period of scanning a record byte on the disk;
    a byte counter coupled to said clock and said photodetector for responding to said byte period signals to increment to a certain predetermined modulus and responsive to said tachometer mark pulse to reset the count to 0;
    register means coupled to said counter for receiving the current count therein having an enabling input for storing the received count; and index circuit means operatively coupled to the optical disk for generating an index pulse signal in response to sensing said index line and coupled to said register enabling input for supplying an index pulse to the enabling input such that the register captures the current segment count at index time of the disk.

4. In the disk player set forth in claim 3, further including, in combination:

said second circuit means, including:

a comparison circuit coupled to said segment counter and said register for supplying a segment edge signal when the numerical contents of the register and the counter are equal;

a segment counter coupled to said photodetector circuit for receiving the tachometer mark pulses for counting same and further coupled to said index circuit for clearing the count value to zero and supplying an output signal indicative of the number of marks counted since the last index as an address of the respective segments on the record disk track; and said rotational position signals comprising said segment edge signal and said segment number signals.

5. In the disk player set forth in claim 1, further including, in combination:

said record disk having a plurality of tracks, with each of the tracks capable of storing a plurality of bytes serially, with a predetermined rotational elapsed time required for scanning each of the respective bytes as a byte period; and said tachometer member having its rotational reference marks rotationally spaced apart to subtend an angle of rotation corresponding to an elapsed time which is a predetermined power-of-two of said byte periods for defining a plurality of segments on the disk which are capable of storing said predetermined power-of-two of bytes.

6. In the disk player set forth in claim 5 wherein said second circuit means includes:

a reference-mark pulse counter coupled to said photodetector for counting the marks as addresses of the byte segments stored on the disk; and said tachometer counter coupled to said index detector for receiving the index pulse and resetting the count to zero for synchronizing the tachometer count to the circumferential position of the index on the disk.

7. In the disk player set forth in claim 6, further including:

a comparator for comparing said delta signal with the number of reference marks being scanned on the tachometer member and supplying a signal indicating edge of a segment whenever the two are equal.

8. In the disk player set forth in claim 5 wherein said first circuit means includes:

a photo detector in optical communication with the tachometer member for sensing said marks and supplying tachometer pulses;

a clock operating at a periodicity equal to the byte periods;

means synchronizing the clock to the photo detector;

a byte counter coupled to the clock for receiving the clock signals and counting thereto up to a modulus equal to said predetermined power-of-two; and means coupling the photo detector to the byte counter for supplying a tachometer pulse thereto for resetting same to a reference numeral.

9. In the disk player set forth in claim 8, further including:

a register means coupled to said index circuit for being enabled to receive signals and connected to said byte counter for receiving all of the segment counts therefrom and responsive to the index pulse for storing the current count being supplied.

10. In the disk player set forth in claim 9, further including, in combination:

said second circuit means, including:

a comparator coupled to said register and to said byte counter for comparing the numerical contents thereof and supplying a segment boundary signal when the comparison indicates equality; and a segment counter coupled to said photo detector and to said index pulse for counting the tachometer pulses and resetting the count to a reference count upon receiving each index pulse for synchronizing the tachometer count to the disk rotation.

11. In the disk player set forth in claim 10, further including, in combination:

said third circuit means, including:

a microprocessor; and said record disk including a home address area for storing addresses of defective segments and said microprocessor operating the disk player to record defective segments in the home address area.

12. In a method of operating an optical disk player having a motor-driven spindle adapted to removably receive and support a disk for co-rotation and having a tachometer member on the spindle for indicating rotational displacement of the spindle;

said removable disk having a radially-extending index line indicating the reference angular position on the disk;

the disk having a plurality of tracks, each track capable of storing a large plurality of bytes of information with each byte being stored on the disk being scannable in a byte period of elapsed time;

the steps of:

sensing said tachometer marks for producing tachometer signals;

sensing said index mark and producing an index signal;

operating an oscillator to supply signals indicative of the byte periods on the record disk;

counting the byte periods up to a modulus which is indicative of a predetermined power-of-two of byte periods;

resetting the byte count each time a tachometer pulse is emitted;

capturing and storing the byte count each time a tachometer pulse is supplied and using the captured count as a delta-offset signal for indicating relationship of the index pulse to the tachometer marks;

counting the tachometer marks up to a modulus equal to the data storing capacity of the track divided by said predetermined power-of-two;

resetting the tachometer count each time the index pulse is supplied; and using the numerical content of the tachometer counter as an address for said predetermined number to the power- of-two bytes on the disk and using the delta signal for indicating the boundaries of groups of such signals on the disk.

* * * * *